United States Patent [19]

Sato et al.

[11] Patent Number: 4,526,426

[45] Date of Patent: Jul. 2, 1985

[54] ANTI-LOCK BRAKING SYSTEM AND ASSOCIATED METHOD

[75] Inventors: Makoto Sato, Kamifukuoka; Etsuo Fujii, Wako, both of Japan

[73] Assignee: Honda Giken Kogyo Kabushiki Kaisha, Shibuya, Japan

[21] Appl. No.: 390,038

[22] Filed: Jun. 18, 1982

[30] Foreign Application Priority Data

Jun. 25, 1981 [JP] Japan .................................. 56-98975

[51] Int. Cl.³ ............................ B60T 8/26; B60T 8/02
[52] U.S. Cl. ..................................... 303/6 C; 303/105;
303/115; 303/116; 303/22 R
[58] Field of Search ............................. 303/91, 93–95,
303/102, 103, 105, 111, 116, 119, 22 R, 115;
188/181 C

[56] References Cited

U.S. PATENT DOCUMENTS 4,280,740 7/1981 Ohmori et al. ...................... 303/119
4,320,459 3/1982 Lindeman et al. ................... 303/105
4,418,966 12/1983 Hattwig ............................. 303/22 R

FOREIGN PATENT DOCUMENTS 2610585 9/1977 Fed. Rep. of Germany .... 303/22 R

Primary Examiner—Bruce H. Stoner, Jr.
Assistant Examiner—Alvin Oberley
Attorney, Agent, or Firm—Posnack, Roberts, Cohen & Spiecens

[57] ABSTRACT

An anti-lock braking system for a four-wheel vehicle having a pair of left and right front wheels and a pair of left and right rear wheels in which one pair of wheels carries a greater load than the other, the system comprising a first braking pressure regulator operative to simultaneously reduce the braking pressures in a pair of wheel cylinders of the left and right front wheels in response to an anti-lock control pressure for the front wheels and a second braking pressure regulator operative to simultaneously reduce the braking pressures in a pair of wheel cylinders of the left and right rear wheels in response to an anti-lock control pressure for the rear wheels. A late-period operation type anti-lock control pressure supply device is associated with the pair of left and right wheels carrying the greater load to supply the anti-lock control pressure to the corresponding regulator upon detection of locking of a wheel later than the other in the pair of left and right wheels carrying the greater load. An early-period operation type anti-lock control pressure supply device is associated with the pair of left and right wheels carrying the lesser load to supply the anti-lock control pressure to the corresponding regulator upon detection of locking of at least one of the wheels in the pair of left and right wheels carrying the lesser load.

15 Claims, 2 Drawing Figures

ANTI-LOCK BRAKING SYSTEM AND ASSOCIATED METHOD

FIELD OF THE INVENTION

The present invention relates to anti-lock braking systems and associated methods capable of simultaneously effecting anti-lock control on a pair of front wheels and a pair of rear wheels in correspondence with the distribution of the load on the front and rear wheels.

PRIOR ART

Anti-lock braking control systems have been adopted in which, when the wheels are going to be locked due to excessively large braking force, the braking force is temporarily reduced to avoid lockage and then the braking force is restored.

In the case of automobiles, the ratio of load on the front and rear wheels varies depending on various factors such as loading condition, state of the road surface and running condition, and the optimum braking pressure for each wheel is changed correspondingly. It is, therefore, preferred to effect the anti-lock control on each of the wheels individually. In the case of a four-wheel vehicle, however, anti-lock control for each of four wheels is not practical because the construction of the braking system becomes complicated and the weight is increased undesirably. In addition, the production cost is raised uneconomically. Therefore, it has been proposed to effect anti-lock control on both of the left and right wheels, using the braking state of one of these wheels as a reference.

Various types of systems have been developed for effecting anti-lock control on both of the left and right wheels. One of these systems is an early-period operation type anti-lock control generally referred to as a "low select method" in which the anti-lock control is effected on both of the left and right wheels immediately after the commencement of locking of at least one of the left and right wheels. Another method is a late-period operation type anti-lock control generally referred to as "high select method" in which the anti-lock control is not effected even when one of the left and right wheels is locked but is put into effect on both wheels when the other wheel is also locked.

Usually, the front wheels carry greater load than the rear wheels particularly in the case of front engine, front-wheel drive automobiles. This tendency is increased when the automobile is braked quickly because the center of weight of the automobile is shifted to the front. In the case where the load is distributed unevenly to the front and rear wheels, it is necessary to distribute the braking force in corresponding uneven fashion. Any loss of braking force on the wheels carrying the greater load seriously affects the braking effect on the automobile as a whole, whereas the loss of braking force on the wheels carrying the lighter load is not as serious. Various tests conducted by the present inventors show that a superior braking effect is produced, without any deterioration of course stability and steerability, when the late-period operation type anti-lock control is effected on the left and right wheels carrying the greater load while the early period operation type anti-lock control is effected on the left and right wheels carrying the lighter load.

In most cases, the braking system for automobiles comprises a dual braking system consisting of two systems each being capable of performing the braking operation independently, thereby to ensure the required braking function of the braking system as a whole even if a part of the braking system is damaged. In front engine, front-wheel drive type automobiles in which the front wheels carry a greater load than the rear wheels, a cross-connected type dual braking system is usually adopted in which the right front wheel cylinder and the left rear wheel cylinder belong to one braking system, while the left front wheel and right rear wheel belong to the other braking system. This type of braking system is referred to also as an "X piping type braking system." In this type of braking system, it is not evident, from a technical point of view, how to apply the late-period operation type anti-lock control to the left and right wheels carrying the greater load while applying the early period operation type anti-lock control to the left and right wheels carrying the lighter load, because the braking oil flows independently in each system during the braking.

SUMMARY OF THE INVENTION

It is an object of the invention to provide an anti-lock braking system capable of simultaneously applying to the left and right front wheels and to the left and right rear wheels braking forces corresponding to the loads on the front and rear wheels.

It is a further object of the invention to provide such an anti-lock braking system which is operative in a cross-connected dual hydraulic circuit arrangement in which brake fluid is supplied to one system to the brake cylinders of the right front wheel and the left rear wheel and a second system to the brake cylinders of the left front wheel and the right rear wheel.

In accordance with the above and further objects of the invention, there is provided an anti-lock braking system for a four-wheel vehicle having a pair of front left and right wheels and a pair of rear left and right wheels with a determined load distribution of the vehicle on the front and rear wheels such that one pair carries a greater load than the other pair, each wheel having a respective brake cylinder for applying braking pressure to the wheel in response to pressure fluid supplied from a master cylinder. The anti-lock braking system comprises first anti-lock control means, including a late-period operation system associated with said one pair of wheels carrying the greater load for supplying a control pressure upon locking of one of said wheels of said one pair later than the other wheel of said one pair and a second anti-lock control means including an early period operation system associated with said other pair of wheels carrying the lesser load for supplying a control pressure upon locking of at least of one of the wheels of said other pair. A first regulating means is coupled to one of the anti-lock control means for simultaneously controlling braking pressures in the wheel cylinders of the left and right front wheels in response to supply of control pressure from said one anti-lock control means and a second regulating means is coupled to the other of said anti-lock control means for simultaneously controlling braking pressures in the wheel cylinders of the left and right rear wheels in response to supply of control pressures from said other anti-lock control means.

In further accordance with the invention, there is provided a cross-connected dual hydraulic system including a first hydraulic circuit for supplying pressure fluid from said master cylinder via said first and second regulating means to the wheel cylinder of the right front wheel and the wheel cylinder of the left rear wheel and a second hydraulic circuit for supplying pressure fluid from said master cylinder via said first and second regulating means to the wheel cylinder of the left front wheel and the wheel cylinder of the right rear wheel.

A further object of the invention is to provide an anti-lock braking method for simultaneously applying to the left and right front wheels and to the left and right rear wheels braking forces corresponding to the loads on the front and rear wheels.

A further object of the invention is to provide such an anti-lock braking method in which brake fluid is supplied from the master cylinder along a first circuit to the brake cylinder of the left front wheel and the brake cylinder of the right rear wheel and along a second circuit to the brake cylinder of the right front wheel and the brake cylinder of the left rear wheel.

In further accordance with the invention, the anti-lock braking method comprises simultaneously reducing the braking pressures in the wheel cylinders of the pair of wheels carrying the greater load upon locking of one of the wheels of said pair later than the other wheel of said pair and simultaneously reducing the braking pressures in the wheel cylinders of the pair of wheels carrying the lesser load upon locking of at least one of said wheels of said pair.

In further accordance with the invention, pressure fluid is supplied from the master cylinder along a first path to the brake cylinder of the left front wheel and the brake cylinder of the right rear wheel and along a second path to the brake cylinder of the right front wheel and the brake cylinder of the left rear wheel.

The above and other objects, features and advantages of the invention will become clear from the following description of a preferred embodiment taken in conjunction with the accompanying drawings.

DESCRIPTION OF THE PREFERRED EMBODIMENT

Hereinafter, the invention will be described with respect to specific embodiment applied to an anti-lock braking device of a four-wheel vehicle of front engine, front-wheel drive type in which the front wheels carry a greater load than the rear wheels, with reference to the accompanying drawings.

Figure 1:
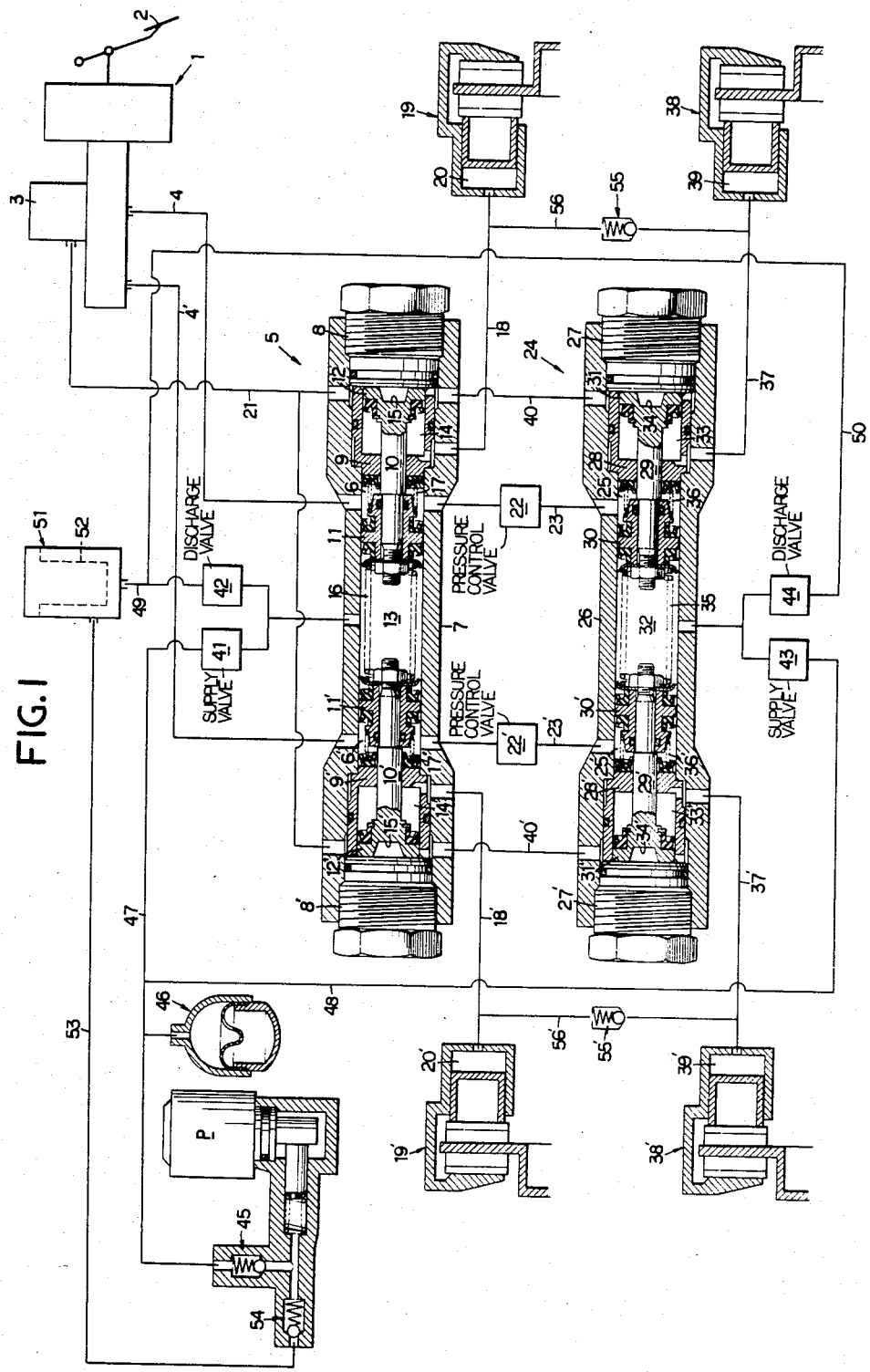
FIG. 1 diagrammatically illustrates a hydraulic system of an anti-lock braking system in accordance with an embodiment of the invention.

Referring first to FIG. 1, therein is seen an anti-lock braking system comprising a tandem master cylinder 1 which is adapted to deliver, as a brake pedal 2 is depressed, the braking fluid to primary braking hydraulic chambers 6, 6' of a first braking pressure regulator 5, through a pair of passages 4, 4' which constitute independent braking systems.

The braking pressure regulator 5 includes a cylinder 7 closed by a pair of end walls 8, 8', a pair of partition walls or bulkheads 9, 9' disposed in the cylinder 7 and spaced from the end walls 8,8', and a pair of rods 10, 10' connecting the pistons of each pair and axially slidably engaged in corresponding bulkheads 9,9'. The cylinder chamber 6 between the bulkhead 9 and the piston 11 constitutes a primary hydraulic chamber of a first hydraulic system and is connected to the master cylinder 1 through the passage 4. A cylinder chamber 14 between the bulkhead 9 and the piston 12 constitutes a secondary braking hydraulic chamber of the first hydraulic system and is connected to a hydraulic chamber 20 of a wheel cylinder 19 for the right front wheel through a passage 18. A cylinder chamber 15 between the end wall 8 and the piston 12 constitutes a relieving hydraulic chamber and is connected to a fluid reservoir 3 (containing brake fluid, e.g., oil) through a passage 21. The cylinder chamber 6' between the bulkhead 9' and the piston 11' constitutes a primary braking hydraulic chamber of the second hydraulic system and is connected to the master cylinder 1 through the passage 4'. A cylinder chamber 14' between the bulkhead 9' and the piston 12' constitutes a secondary braking hydraulic chamber of the second hydraulic system and is connected to the wheel cylinder chamber 20' of the wheel cylinder 19' for the left front wheel through a passage 18'. A cylinder chamber 15' between the end wall 8' and the piston 12' constitutes a relieving oil chamber and is connected to the reservoir 3 through a passage 21. A cylinder chamber 13 between the pair of pistons 11,11' constitutes an anti-lock control hydraulic chamber which is selectively supplied with pressure fluid from a second supply source comprising a pump P or discharges return fluid to the pump in an anti-lock control circuit under the action of supply control valve 41 and discharge control valve 42.

A compression spring 16 is disposed between pistons 11,11', and compression springs 17 and 17' are respectively disposed between the bulkhead 9 and the piston 11 and between the bulkhead 9' and the piston 11'. The pistons 11,12 and the pistons 11',12' undergo smooth and resilient movement by the resilient action of the springs 16,17 and 17' which also serve to hold the pistons at proper positions in the non-braking condition.

The primary braking hydraulic chambers 6,6' are further connected, through passages 23, 23' containing pressure control valves 22,22', to corresponding primary braking hydraulic chambers 25, 25' of a braking pressure regulator 24. The second braking pressure regulator 24 basically has the same construction as the first braking pressure regulator 5. Namely, it comprises a cylinder 26 closed at both ends by a pair of end walls 27,27', a pair of partition walls or bulkheads 28, 28' disposed in the cylinder 26 and spaced from the end walls 27, 27' and pairs of pistons 30,31 and 30',31' disposed at both end portions of the cylinder 26. A pair of rods 29 and 29' connect the pistons of respective pairs and extend axially slidably through respective bulkheads 28, 28'. A cylinder chamber 25 between the bulkhead 28 and the piston 30 constitutes a primary braking hydraulic chamber and is connected to the master cylinder 1 through a passage 23, hydraulic control valve 22, primary braking hydraulic chamber 6 of the first braking pressure regulator 5, and the passage 4. A cylinder chamber 33 between the bulkhead 28 and the piston 31 constitutes a secondary braking hydraulic chamber of the first hydraulic system and is connected to the hydraulic chamber 39 of the wheel cylinder 38 for the left rear wheel through a passage 37. A cylinder chamber 34 between the end wall 27 and the piston 31 constitutes a relieving oil chamber and is connected to the reservoir 3 through a passage 40, relieving oil chamber 15 of the first braking pressure regulator 5 and the passage 21. A cylinder chamber 25' between the bulkhead 28' and the piston 30' constitutes a primary braking chamber of the second hydraulic system and is connected to the master cylinder 1 through the passage 23', hydraulic control valve 22', primary braking hydraulic chamber 6' of the first hydraulic pressure regulator 5 and passage 4'. A cylinder chamber 33' between the bulkhead 28' and the piston 31' constitutes a secondary braking hydraulic chamber of the second hydraulic system and is connected through a passage 37' to the chamber 39' of the wheel cylinder 38' for the right rear wheel. A cylinder chamber 34' between the end wall 27' and the piston 31' constitutes a relieving oil chamber and is connected with the reservoir 3 through a passage 40', relieving chamber 15' of the first braking pressure regulator 5 and the passage 21. A cylinder chamber 32 between the pair of pistons 30,30' constitutes an anti-lock control hydraulic chamber to which and from which pressure fluid flows from pump P under the control of supply and discharge control valves 43 and 44 respectively.

A compression spring 35 is disposed between the pair of pistons 30,30' and compression springs 36 and 36' are respectively interposed between the bulkhead 28 and the piston 30 and between the bulkhead 28' and the piston 30'. The pistons 30,31 and 30',31' undergo resilient and smooth movement under the resilient force of the compression springs 35, 36 and 36' which also serve to hold the pistons at proper positions in the non-braking condition.

The hydraulic control valves 22, 22' control the primary braking pressure, particularly in the period immediately after the start of braking, such that the braking force on the rear wheels (carrying less load than the front wheels) is reduced as compared to the braking force on the front wheels carrying greater load, in proportion to the load. As a result of the pressure reducing operation performed by the pair of hydraulic control valves 22, 22', the hydraulic pressure in the pair of primary braking hydraulic chambers 6,6' is raised as compared with the hydraulic pressure in the pair of primary braking hydraulic chambers 25,25', in proportion to the ratio of the load, particularly in the period immediately after the commencement of braking. As a consequence, in the period immediately after the commencement of braking, the hydraulic pressure generated in the secondary braking hydraulic chambers 14, 14' for the front wheels is higher than that generated in the secondary braking hydraulic chambers 33,33' for the rear wheels. The control valves 22 and 22' are conventional pressure-reducing or load responsive valves familiar to those skilled in the art.

In the event that the transmission of hydraulic pressure to the wheel cylinders 19,19' for the front wheels fails due to trouble in the secondary braking hydraulic system, the reduction in the braking effort in the automobile is greater than the case where the trouble takes place in the secondary braking hydraulic system for the rear wheels. In order to eliminate such disadvantage, the pair of hydraulic passages 18 and 18' are connected to corresponding passages 37, 37' by passages 56,56' provided with respective check valves 55,55'. The check valves 55,55' operate as follows. Assuming that at least one of the secondary braking hydraulic chambers 14,14' fails to generate secondary braking pressure due to trouble in the secondary braking hydraulic system of a front wheel, the hydraulic pressure in the wheel cylinder chambers 39,39' for the rear wheels may become higher than the pressure in the wheel cylinder chambers 20,20' for the front wheels by a pressure exceeding a predetermined set value. In such a case, the check valves 55,55' operate to permit the hydraulic pressure in the secondary hydraulic chambers 33,33' for the rear wheels to be transmitted without delay to corresponding wheel cylinder chamber 20 or 20' for the front wheels.

In the anti-lock control system, control fluid, such as oil, is pressurized by the second supply source comprising pump P such as a plunger pump or the like and the control oil is delivered to the supply control valve 41 via check valve 45 and a passage 47 which is connected to a pressure accumulator 46. The control oil is also delivered to the supply control valve 43 through a passage 48 shunted from the passage 47.

The control oil discharged from the discharge control valve 42 is delivered to an oil tank 51 through a passage 49, while the control oil discharged from the discharge control valve 44 is delivered to the oil tank 51 through passages 50 and 49. The control oil in the oil tank 51 is constrained to flow through a filter 52 and then flows through passage 53 and a check valve 54 to be pressurized again by the hydraulic pressure source P.

Next will be described apparatus for controlling the opening and closing of the supply control valves 41, 43 and the discharge control valves 42,44 in the anti-lock control system.

Figure 2:
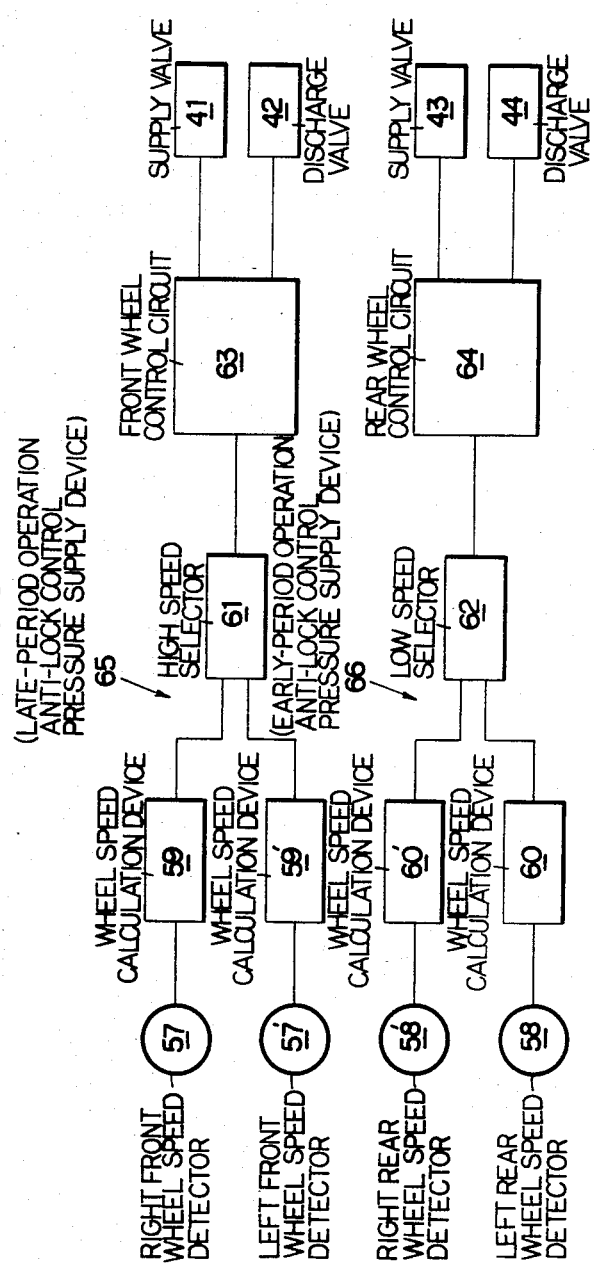
FIG. 2 is a signal diagram of the anti-lock braking system.

Referring to FIG. 2, the supply control valve 41 and the discharge control valve 42 are adapted to be opened and closed by a late-period operation type anti-lock control pressure supply device 65, whereas the supply control valve 43 and the discharge control valve 44 are adapted to be opened and closed by an early-period type anti-lock control pressure supply device 66. A signal generated by a wheel speed detector 57 for the right front wheel is transformed by a wheel speed calculation device 59 into a wheel speed signal having a value proportional to the peripheral speed of the right front wheel. The wheel speed signal is delivered to a high-speed selector 61 such as a high-select circuit. Meanwhile, a signal generated by a wheel speed detector 57' for the left front wheel is transformed by a wheel speed calculation device 59' into a wheel speed signal having a value proportional to the peripheral speed of the left front wheel. The signal is then delivered to the high-speed selector 61. The high-speed selector then selects the higher one of the wheel speed signals representing the wheel speeds of the left and right front wheels, and delivers the selected signal to a control circuit 63 for the front wheels. The control circuit 63 for the front wheels calculates the slip rate of the wheel of higher peripheral speed and acceleration or deceleration thereof, and normally holds the supply control valve 41 and the discharge control valve 42 respectively in the closed and opened states. However, when the wheel of higher peripheral speed, i.e., the wheel locked later than the other, becomes locked, the control circuit 63 for the front wheels immediately opens the supply control valve 41 while closing the discharge control valve 42, thereby to permit the control oil to be supplied from the hydraulic pressure source P to the anti-lock control hydraulic chamber 13.

On the other hand, a signal produced by a wheel speed detector 58' for the right rear wheel is transformed by a wheel speed calculator 60' to a wheel speed signal having a value proportional to the peripheral speed of the right rear wheel. The wheel speed signal is then delivered to a low-speed selector 62 such as a low-select circuit. Meanwhile, the signal generated by a wheel speed detector 58 for the left rear wheel is transformed by a wheel speed calculator 60 into a wheel speed signal having a value proportional to the peripheral speed of the left rear wheel and the wheel speed signal thus obtained is delivered to the low-speed selector 62. The low speed selector 62 selects the lower one of the wheel speed signals and delivers the same to a control circuit 64 for the rear wheels. The control circuit 64 for the rear wheels calculates the slip rate and acceleration or deceleration of the wheel of lower peripheral speed and normally holds the supply control valve 43 and the discharge control valve 44 in the closed and opened states, respectively. However, when the rear wheel of lower peripheral speed, i.e., the wheel locked earlier than the other, becomes locked, the control circuit 64 immediately opens the supply valve 43 while closing the discharge valve 44 thereby to permit the control oil to be supplied from the hydraulic pressure source P into the anti-lock control hydraulic chamber 32.

The supply control valves 41,43 and the discharge control valves 42,44 may be constructed as solenoid-actuated control valves in which the supply control valves 41,43 are closed when de-energized and opened when energized while the discharge control valves 42,44 are opened when de-energized and closed when energized.

The operation of the described embodiment will be given hereinafter.

As the brake pedal 2 is depressed, the braking pressure produced in the master cylinder 1 is transmitted to the primary braking hydraulic chambers 6,6' for the front wheels through the passages 4,4' and also to the primary braking hydraulic chambers 25,25' through the passages 23,23'. As a consequence, pairs of pistons 11,11' and 30,30' are acted on by the primary braking hydraulic pressure in the primary braking hydraulic chambers 6,6' and 25,25', respectively, so that the rods 10 and 10' and rods 29 and 29' are moved towards each other in respective cylinders 7 and 26, thereby to produce secondary braking hydraulic pressures in the secondary braking hydraulic chambers 14,14' and 33,33'. In this state, by the operation of the pair of hydraulic control valves 22,22', the primary braking pressure in the primary braking hydraulic chambers 25,25' for the rear wheels is adjusted to be lower than the primary braking hydraulic chambers 6,6' for the front wheels by an amount corresponding to the difference of the load applied to the rear and front wheels, so that the secondary braking pressure generated in the secondary braking hydraulic chambers 33,33' for the rear wheels is lower than that generated in the secondary braking hydraulic chambers 14,14' for the front wheels by an amount corresponding to the load on the rear and front wheels.

If it is assumed that the hydraulic pressure in the wheel cylinder chamber 39 or 39' of a rear wheel becomes higher than the wheel cylinder chamber 20 or 20' of a front wheel by an amount exceeding the set pressure of the corresponding check valve 55 or 55', due to trouble in the secondary braking hydraulic system of the front wheel, hydraulic pressure is transmitted from the corresponding secondary braking hydraulic chamber 33 or 33' via passage 56 or 56' to the wheel cylinder chamber 20 or 20' of the affected front wheel, thereby to compensate for the loss of braking force for the front wheels.

Assuming that the front wheel, which is locked later than the other front wheel, becomes locked, the late-period type anti-lock control oil supplying device 65 operates to open the normally closed supply valve 41 while closing the normally open discharge valve 42 so that the control oil supplied from the hydraulic pressure source P is immediately introduced into the anti-lock control hydraulic chamber 13 thereby to urge the pistons 11,11' away from each other. As a consequence, the secondary braking pressure in the secondary braking chambers 14,14' is lowered so that the braking force applied to the left and right front wheels by their respective wheel cylinders 19,19' is decreased or eliminated until at least one of the front wheels is unlocked. Meanwhile, the fluid in the relieving chambers 15,15' is pressurized by respective pistons 12,12' and is returned to the reservoir 3 through the passage 21.

On the other hand, when at least one of the rear wheels is locked during braking, the early-period operation type anti-lock control device 66 operates to open the normally closed supply control valve 43, while closing the normally open discharge control valve 44 so that the control oil from the hydraulic pressure source P is immediately introduced into the anti-lock control chamber 32 thereby to urge the pistons 30,30' away from each other. As a consequence, the secondary braking pressure in the secondary braking chambers 33,33' is lowered so that the braking force on the left and right rear wheels provided by the wheel cylinders 38,38' is decreased or eliminated until the left and right rear wheels are unlocked. Meanwhile, the fluid in the relieving chambers 34,34' is pressed by respective pistons 31,31' and returned to the reservoir 3 through the passages 40,40', relieving chambers 15,15' and the passage 21.

As has been described, according to the invention, there is provided an anti-lock braking system having first braking pressure regulator 5 operative to simultaneously lower the braking pressures in the brake cylinders 19,19' corresponding to the left and right front wheels in response to the anti-lock control hydraulic pressure for the front wheels, and second braking pressure regulator 24 operative to simultaneously lower the braking oil pressures in the brake cylinders 38,38' corresponding to the left and right rear wheels in response to the anti-lock control hydraulic pressure for the rear wheels. It is, therefore, possible to effect simultaneously the anti-lock control on the pair of front wheels and on the pair of rear wheels by a simple circuit arrangement. In addition, it is possible to effect a simultaneous anti-lock control on the left wheels and right wheels at the front and rear because the late-period operation type anti-lock control pressure supplying device is applied to the left and right wheels carrying higher load while the early-period operation type anti-lock control pressure supplying device is used for the left and right wheels carrying lighter load.

Furthermore, according to the invention, it is possible to obtain the required braking effect, course stability and steerability with a simple hydraulic circuit arrangement, because of the adoption of a cross connection type dual braking system in which passage 4 supplies brake fluid to the brake cylinders of the right front wheel and the left rear wheel and passage 4' supplies brake fluid to the brake cylinders of the left front and right rear wheels.

Although the invention has been described in conjunction with a specific embodiment thereof, it will become apparent to those skilled in the art that numerous modifications and variations can be made within the scope and spirit of the invention as defined by the attached claims.

What is claimed is:

1. An anti-lock braking system for a four wheel vehicle having a pair of front left and right wheels and a pair or rear left and right wheels, each wheel having a respective brake cylinder for applying braking pressure to the wheel in response to pressure fluid supplied from a master cylinder, said anti-lock braking system comprising: first high-select type anti-lock control means associated with one pair of wheels for supplying a control pressure upon locking of one of said wheels of said one pair later than the other wheel of said one pair, second low-select type anti-lock control means associated with the other pair of wheels for supplying a control pressure upon locking of at least one of the wheels of said other pair, first regulating means coupled to one of said anti-lock control means for simultaneously controlling braking pressures in the wheel cylinders of the left and right front wheels in response to supply of control pressure from said one anti-lock control means, second regulating means coupled to the other of said anti-lock control means for simultaneously controlling braking pressure in the wheel cylinders of the left and right rear wheels in response to supply of control pressure from said other anti-lock control means, a dual hydraulic circuit arrangement including a first hydraulic circuit for supplying pressure fluid from said master cylinder via said first and second regulating means to one of the two front wheel cylinders and one of the two rear wheel cylinders and a second hydraulic circuit for supplying pressure fluid via said first and second regulating means to the other front wheel cylinder and the other rear wheel cylinder, fluid pressure control valve means in said first and second hydraulic circuits for controlling the pressure supplied to the front and rear wheel cylinders in proportion to load distribution on the front and rear wheels, and a second source of fluid pressure connected to said first and second regulating means respectively by said first and second anti-lock control means.

2. An anti-lock braking system as claimed in claim 1 wherein said first and second anti-lock control means respectively comprises valve means for controlling flow of said pressure fluid from said second source to and from the respective regulating means for controlling the fluid pressures transmitted to the wheel cylinders.

3. An anti-lock braking system as claimed in claim 2 wherein said first and second regulating means each respectively comprises a regulating unit operatively connected to the first and second hydraulic circuits for supplying brake fluid to the respective pair of associated wheels.

4. An anti-lock braking system as claimed in claim 3 wherein the regulating unit of the first regulating means is connected to the regulating unit of the second regulating means via said fluid pressure control valve means such that one of said regulating units delivers brake fluid to the wheel cylinders of its associated wheels at a reduced pressure to establish the pressure in the front and rear cylinders in proportion to the load distribution on the wheels.

5. An anti-lock braking system as claimed in claim 4 comprising a passage including a check valve connecting the output of the first regulating unit to the wheel cylinder of the right front wheel with the output of the second regulating unit to the wheel cylinder of the left rear wheel, and a second passage including a second check valve connecting the output of the first regulating unit to the wheel cylinder of the left front wheel to the output of the second regulating unit to the wheel cylinder of the right rear wheel.

6. An anti-lock braking system as claimed in claim 2 wherein each said regulating unit is operatively connected to the first and second hydraulic circuits and includes:

a first, secondary hydraulic fluid pressure chamber receiving pressure fluid at a primary fluid pressure via said first hydraulic circuit and producing a secondary fluid pressure proportional to said primary fluid pressure and supplied to the wheel cylinder of one of the associated wheels;

a second, secondary hydraulic fluid pressure chamber receiving pressure fluid at a primary fluid pressure via said second hydraulic circuit and producing a secondary fluid pressure proportional to said primary fluid pressure and supplied to the wheel cylinder of the other of the associated wheels; and an anti-lock control fluid pressure chamber connected to said second source of pressure via its respective valve means to act in response to supply of pressure fluid from said second pressure source by said valve means to expand said first and second secondary hydraulic fluid pressure chambers thereby to reduce the fluid pressure therein and thereby in the wheel cylinders connected thereto.

7. An anti-lock braking system as claimed in claim 6 wherein said valve means for each respective regulating unit has one state in which pressure fluid from said second source of pressure does not flow to said anti-lock control fluid pressure chamber but is free to flow from said chamber whereby said first and second secondary hydraulic fluid pressure chambers can freely contract and a second state in which pressure fluid from said second source of pressure flows to said anti-lock control fluid pressure chamber to expand said first and second secondary chambers.

8. An anti-lock braking system as claimed in claim 7 wherein said valve means for each regulating unit includes a first valve having a normally closed state and a second valve having a normally open state, said first valve controlling flow of pressure fluid from said second source to said anti-lock control fluid pressure chamber, said second valve controlling flow of pressure fluid from said anti-lock control fluid pressure chamber back to said second source, the first valve being opened when the second valve is closed and vice-versa, said first and second anti-lock control means respectively including a control circuit for operating said first and second valves of the valve means associated with the respective anti-lock control means.

9. An anti-lock braking system as claimed in claim 8 wherein said control circuit of said first anti-lock control means includes first and second sensor means for respectively sensing speed of rotation of said left and right front wheels, selector means connected to said first and second sensor means for selecting the signal therefrom indicating higher speed of wheel rotation and means for operating said first and second valves when the selected wheel speed indicates lockage of the respective wheel.

10. An anti-lock braking system as claimed in claim 8 wherein said control circuit of said second anti-lock control means includes first and second sensor means for respectively sensing speed of rotation of said left and right rear wheels, selector means connected to said first and second sensor means for selecting the signal therefrom indicating lower speed of wheel rotation and means for operating said first and second valves when the selected wheel speed indicates lockage of the respective wheel.

11. An anti-lock braking system as claimed in claim 6 wherein each said regulating unit comprises a cylinder including first opposed spaced pistons defining said anti-lock control fluid pressure chamber therebetween, partition walls facing respective first pistons on sides thereof remote from said anti-lock control fluid pressure chamber, and a second pair of pistons spaced from respective partition walls to define said secondary hydraulic fluid pressure chambers therewith, and rod means coupling said first and second pistons for respective common displacement.

12. An anti-lock braking system as claimed in claim 11 wherein each said regulating unit further comprises first spring means engaging said first pistons for opposing displacement towards one another, and second spring means opposing movement of said first pistons towards their respective partition walls.

13. An anti-lock braking system as claimed in claim 12 wherein said first pistons and said partition walls define respective primary fluid pressure chambers, the primary chambers of said first regulating unit being respectively connected to the master cylinder for receiving pressure fluid therefrom and to the primary chambers of the second regulating unit via said fluid pressure control valve means.

14. An anti-lock braking system as claimed in claim 1 wherein said dual hydraulic circuit arrangement is cross connected so that said first hydraulic circuit supplies pressure fluid from said master cylinder via said first and second regulating means to the wheel cylinder of the right front wheel and the wheel cylinder of the left rear wheel and said second hydraulic circuit supplies pressure fluid from said master cylinder via said first and second regulating means to the wheel cylinder of the left front wheel and the wheel cylinder of the right rear wheel.

15. An anti-lock braking system as claimed in claim 1 wherein said first anti-lock control means of high-select type includes a late period operation system and said second anti-lock control means of low-select type includes an early period operation system.

* * * * *